United States Patent
Aizawa et al.

(10) Patent No.: US 9,473,327 B2
(45) Date of Patent: Oct. 18, 2016

(54) RADIO COMMUNICATION DEVICE, RADIO COMMUNICATION METHOD, AND RADIO COMMUNICATION SYSTEM

(71) Applicant: FUJITSU LIMITED, Kawasaki-shi, Kanagawa (JP)

(72) Inventors: Shigemi Aizawa, Gyouda (JP); Ichio Shimizu, Kumagaya (JP); Ken Hiratsuka, Kumagaya (JP); Hikaru Murano, Kumagaya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/751,352

(22) Filed: Jun. 26, 2015

(65) Prior Publication Data

US 2016/0065248 A1    Mar. 3, 2016

(30) Foreign Application Priority Data

Aug. 29, 2014    (JP) ................. 2014-176165

(51) Int. Cl.
*H04B 1/02*    (2006.01)
*H04L 25/02*    (2006.01)
*H04L 1/00*    (2006.01)
*H04L 27/00*    (2006.01)

(52) U.S. Cl.
CPC .............. *H04L 25/022* (2013.01); *H04L 1/00* (2013.01); *H04L 27/0008* (2013.01)

(58) Field of Classification Search
CPC ......... H04B 1/00; H04B 1/02; H04W 72/08; H04W 72/0413; H01L 1/0001; H01L 1/0009; H01L 1/0019; H01L 1/20; H01L 25/022; H01L 25/0222; H01L 27/12; H01L 27/28
See application file for complete search history.

(56) References Cited

U.S. PATENT DOCUMENTS

| 6,408,189 | B1 | 6/2002 | Nakamura et al. | |
|---|---|---|---|---|
| 2002/0119757 | A1* | 8/2002 | Hamabe | H04L 1/0003 455/69 |
| 2003/0021243 | A1* | 1/2003 | Hamalainen | H04L 1/0009 370/329 |
| 2003/0123477 | A1* | 7/2003 | Gollamudi | H04L 1/20 370/465 |
| 2004/0110473 | A1* | 6/2004 | Rudolf | H04L 1/0026 455/69 |
| 2015/0215069 | A1* | 7/2015 | Lin | H04L 1/0009 370/329 |
| 2016/0150524 | A1* | 5/2016 | Ramkumar | H04W 72/0413 370/329 |

FOREIGN PATENT DOCUMENTS

| JP | 2000-151482 | 5/2000 |
|---|---|---|
| JP | 2005-020076 | 1/2005 |
| JP | 2005-079905 | 3/2005 |
| JP | 2011-004118 | 1/2011 |
| JP | 2012-004876 | 1/2012 |

* cited by examiner

Primary Examiner — Thanh Le
(74) Attorney, Agent, or Firm — Fujitsu Patent Center

(57) ABSTRACT

A radio communication device includes: a processor configured to execute a program; and a memory configured to store the program, wherein the processor performs, based on the program, operations to: detect communication quality of each of a plurality of channels; and lower a first set modulation level of a first channel with the communication quality which is equal to or lower than a level and a second set modulation level of a first adjacent channel as at least one of two adjacent channels adjacent to the first channel in a frequency axis direction.

20 Claims, 12 Drawing Sheets

RADIO COMMUNICATION DEVICE, RADIO COMMUNICATION METHOD, AND RADIO COMMUNICATION SYSTEM

CROSS-REFERENCE TO RELATED APPLICATION

This application is based upon and claims the benefit of priority of the prior Japanese Patent Application No. 2014-176165, filed on Aug. 29, 2014, the entire contents of which are incorporated herein by reference.

FIELD

The embodiment discussed herein is related to a radio communication device, a radio communication method, and a radio communication system.

BACKGROUND

Between a radio communication device on a transmission side and a radio communication device on a reception side, communication using "adaptive modulation" is performed.

A related technique is disclosed in Japanese Laid-open Patent Publication No. 2011-004118 or Japanese Laid-open Patent Publication No. 2000-151482.

SUMMARY

According to an aspect of the embodiments, a radio communication device includes: a processor configured to execute a program; and a memory configured to store the program, wherein the processor performs, based on the program, operations to: detect communication quality of each of a plurality of channels; and lower a first set modulation level of a first channel with the communication quality which is equal to or lower than a level and a second set modulation level of a first adjacent channel as at least one of two adjacent channels adjacent to the first channel in a frequency axis direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
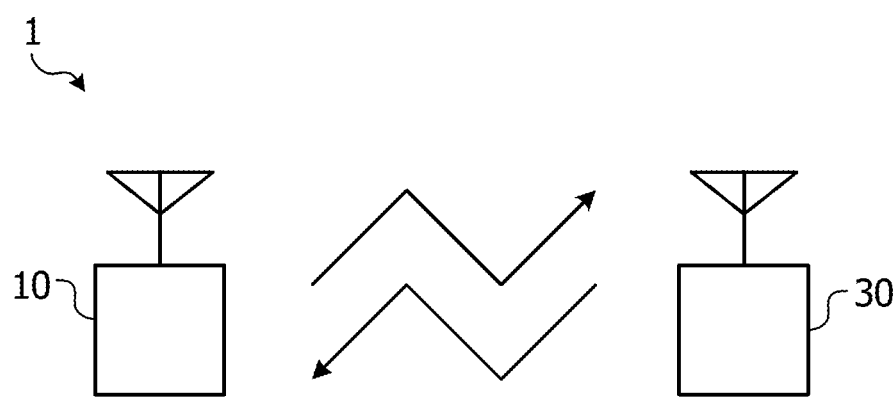
FIG. 1 illustrates an exemplary radio communication system.

For example, a set modulation level applied to communication is switched in accordance with the communication quality. Accordingly, communication throughput may be improved.

Between a radio communication device on a transmission side and a radio communication device on a reception side, communication using a plurality of channels such as frequency bands is performed, and adaptive modulation is performed independently for each channel.

When the frequency position where frequency selective fading occurs moves at a high speed across the channels, with adaptive modulation independent for each channel, the move of the occurrence frequency position may not be followed. Accordingly, the error rate may be increased, whereby the quality of the transmission signals may be lowered.

In embodiments described below, structures having substantially the same or similar functions are denoted by the same reference numerals and overlapping description thereof may be omitted or reduced. Substantially the same or similar processing is denoted by the same reference symbols and overlapping description thereof may be omitted or reduced.

FIG. 1 illustrates an exemplary radio communication system. In FIG. 1, a radio communication system 1 includes a radio communication device 10 and a radio communication device 30. The radio communication device 10 may be a radio communication device on a transmission side transmitting a data signal, and the radio communication device 30 may be a radio communication device on a reception side receiving the data signal transmitted from the radio communication device 10. The radio communication device 10 and the radio communication device 30 may be, for example, backbone devices such as base station devices or relay station devices. The radio communication device 10 and the radio communication device 30 are able to communicate with each other with a plurality of channels such as frequency bands, and communicate using a modulation scheme of the modulation level set for each channel.

The radio communication device 30 detects the communication quality of each channel. The radio communication device 30 performs "switching control" based on the detected communication quality of each channel. For example, under the "switching control", the radio communication device 30 lowers the set modulation level of a channel of which the detected communication quality has been lowered to a certain level or lower (hereinafter, may be referred to as a "quality degraded channel"). Under the "switching control", the radio communication device 30 lowers the modulation level of at least one of two adjacent channels that are adjacent to the quality degraded channel in the frequency direction. For example, the modulation levels of both of the adjacent channels may be lowered, or the modulation level of one of the adjacent channels may be lowered.

For example, the radio communication device 30 generates a "switching control signal" including identification information of a switching target channel of which the modulation level is to be lowered, information indicating the modulation level after being lowered, and information indicating the switching timing such as information indicating a switching start frame. The radio communication device 30 forwards the generated switching control signal to a demodulation unit thereof and transmits the generated switching control signal to the radio communication device 10.

At a switching timing indicated by the switching control signal transmitted from the radio communication device 30, the radio communication device 10 switches the modulation scheme of the channel indicated by the switching control signal to the modulation scheme of the modulation level indicated by the switching control signal. At a timing substantially the same as that, switching of modulation schemes may be performed for the same channel also in the demodulation unit of the radio communication device 30.

As described above, the radio communication device 30 performs switching control that lowers the set modulation levels of the quality degraded channel of which the communication quality has been degraded to a certain level or lower and the channels adjacent to the quality degraded channel. Accordingly, even when the frequency position where frequency selective fading occurs moves at a high speed, adaptive modulation may follow the move. Quality degradation of the transmission signals may be reduced even under high speed moving fading environment.

Figure 2:
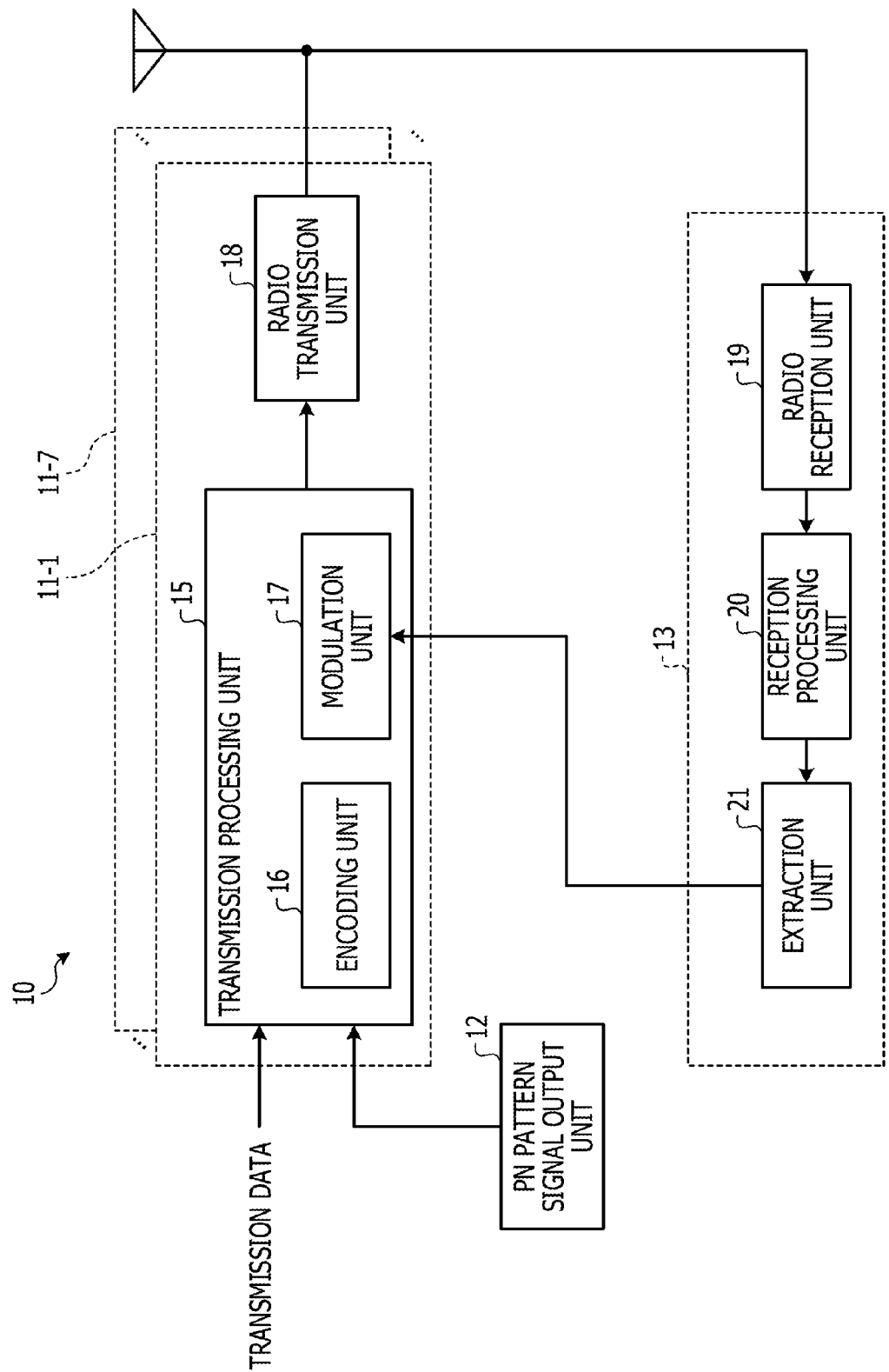
FIG. 2 illustrates an exemplary radio communication device on a transmission side.

FIG. 2 illustrates an exemplary radio communication device on a transmission side. In FIG. 2, the radio communication device 10 includes transmission units 11-1 to 11-7, a pseudo random noise (PN) pattern signal output unit 12, and a reception unit 13. For example, in correspondence with the number of seven channels, seven transmission units 11 may be provided. The number of channels may be any other number.

The transmission units 11-1 to 11-7 correspond to channels 1 to 7 respectively. Each transmission unit 11 includes a transmission processing unit 15 that includes an encoding unit 16 and a modulation unit 17 and a radio transmission unit 18.

The transmission processing unit 15 performs transmission processing on input transmission data or a PN pattern signal and outputs a signal thus obtained to the radio transmission unit 18. The transmission processing may include encoding processing performed by the encoding unit 16 and modulation processing performed by the modulation unit 17. The modulation unit 17 switches modulation schemes for example, set modulation levels based on the "switching control signal" transmitted from the radio communication device 30. The PN pattern signal may be a known pattern signal.

The radio transmission unit 18 performs predetermined radio transmission processing such as digital-analog conversion or up-converting on the signal output from the transmission processing unit 15 and transmits the radio signal thus obtained via an antenna.

The reception unit 13 includes a radio reception unit 19, a reception processing unit 20, and an extraction unit 21.

The radio reception unit 19 performs radio reception processing such as down-converting or analog-digital conversion on the signal received via the antenna and outputs the signal thus obtained to the reception processing unit 20.

The reception processing unit 20 performs reception processing such as demodulation and decoding on the signal received from the radio reception unit 19 and outputs the reception data thus obtained to the extraction unit 21.

The extraction unit 21 extracts the "switching control signal" described above from the reception data received from the reception processing unit 20. The extraction unit 21 outputs the switching control signal thus extracted to the modulation unit 17 of the transmission unit 11 corresponding to the switching target channel indicated by the switching control signal. With this, the modulation unit 17 having received the switching control signal switches modulation schemes at the switching timing indicated by the switching control signal.

Figure 3:
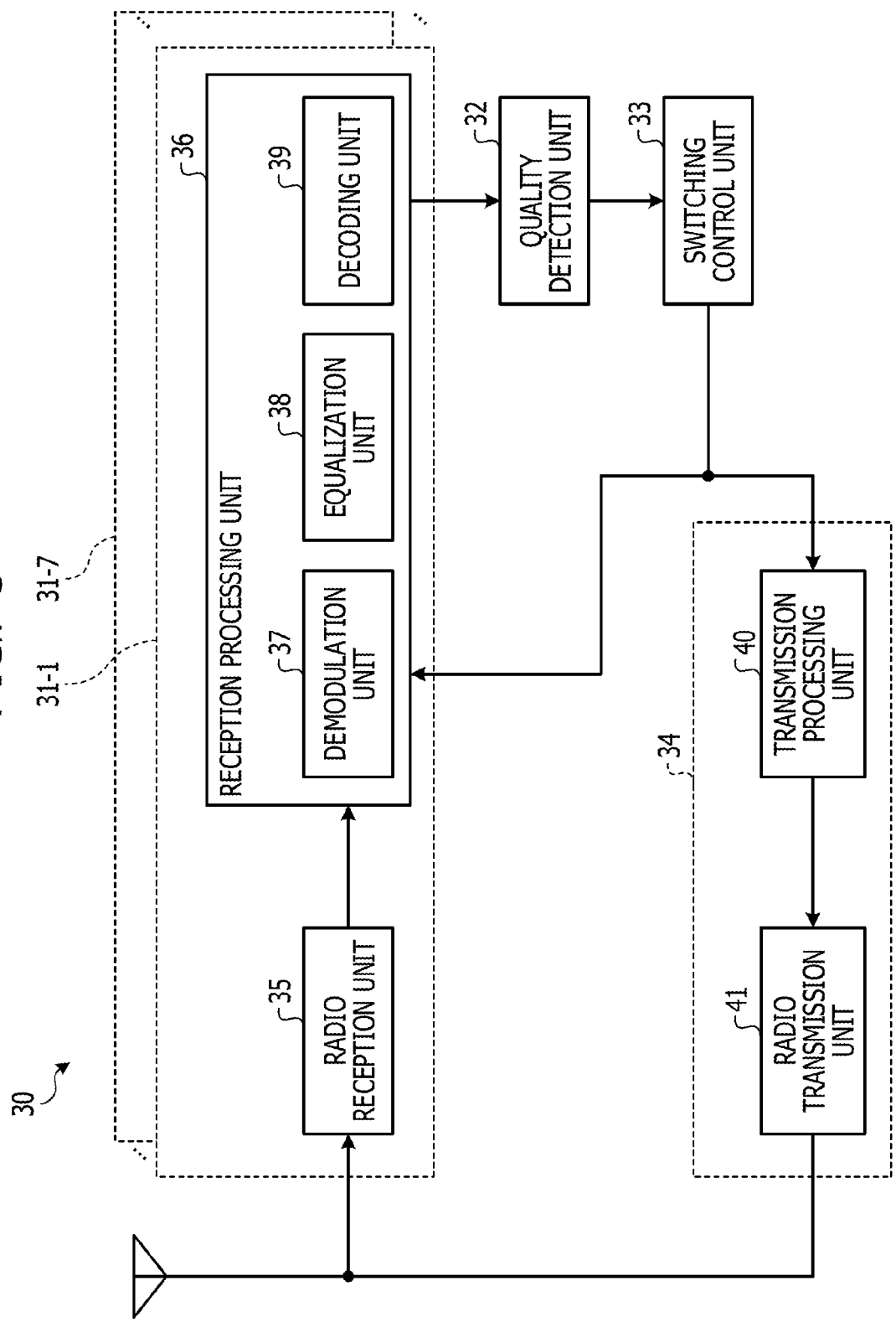
FIG. 3 illustrates an exemplary radio communication device on a reception side.

FIG. 3 illustrates an exemplary radio communication device on a reception side. In FIG. 3, the radio communication device 30 includes reception units 31-1 to 31-7, a quality detection unit 32, a switching control unit 33, and a transmission unit 34. For example, in correspondence with the number of seven channels, seven reception units 13 may be provided. The number of channels may be any other number.

The reception units 31-1 to 31-7 correspond to the channels 1 to 7 respectively. Each reception unit 31 includes a radio reception unit 35 and a reception processing unit 36 that includes a demodulation unit 37, an equalization unit 38, and a decoding unit 39.

The radio reception unit 35 performs radio reception processing such as down-converting or analog-digital conversion on the signal received via the antenna and outputs the signal thus obtained to the reception processing unit 36.

The reception processing unit 36 performs reception processing on the signal received from the radio reception unit 35 to obtain reception data. The reception processing may include demodulation processing performed by the demodulation unit 37, equalization processing performed by the equalization unit 38, and decoding processing performed by the decoding unit 39. The demodulation unit 37 switches demodulation schemes such as set modulation levels based on the "switching control signal" output from the switching control unit 33. The equalization unit 38 may be a transversal equalizer (TRV), for example.

The quality detection unit 32 detects the communication quality of the channel based on a signal component included in the reception data obtained by the reception processing unit 36 and corresponding to the PN pattern signal (hereinafter, may be referred to as a "reception PN pattern signal") and a replica signal of the PN pattern signal. The detection of the communication quality may be performed for each channel. The replica signal of the PN pattern signal may be retained in advance in the quality detection unit 32.

Figure 4:
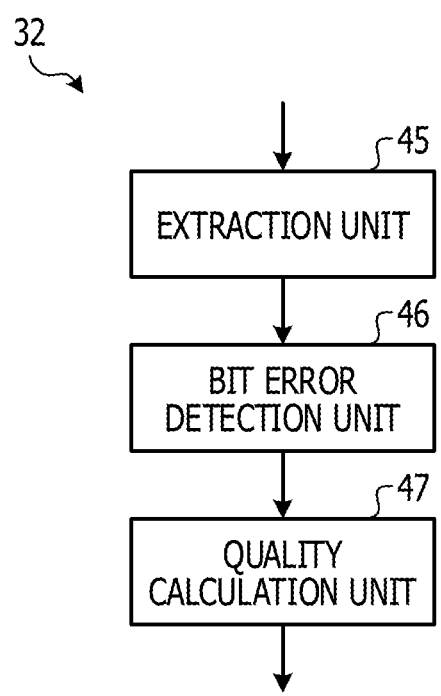
FIG. 4 illustrates an exemplary quality detection unit.

FIG. 4 illustrates an exemplary quality detection unit. For example, the quality detection unit 32 includes an extraction unit 45, a bit error detection unit 46, and a quality calculation unit 47, as illustrated in FIG. 4.

The extraction unit 45 extracts the reception PN pattern signal from the reception data obtained by the reception processing unit 36 and outputs the reception PN pattern signal thus extracted to the bit error detection unit 46.

The bit error detection unit 46 compares the reception PN pattern signal received from the extraction unit 45 and the replica signal of the PN pattern signal to detect a reception error, for example, a bit error.

The quality calculation unit 47 counts the number of reception errors in each determination period for each channel. The quality calculation unit 47 detects the channel of which the number of reception errors in the determination period exceeds a determination threshold such as a quality degraded channel and outputs identification information of the quality degraded channel thus detected to the switching control unit 33.

The switching control unit 33 illustrated in FIG. 3 determines the quality degraded channel indicated by the identification information received from the quality calculation unit 47 and at least one of the two adjacent channels that are adjacent to the quality degraded channel in the frequency direction to be the switching target channels. The switching control unit 33 generates the "switching control signal" including identification information of the switching target channels, information indicating the modulation level after being lowered, and information indicating the switching timing. The switching control unit 33 outputs the switching control signal thus generated to the demodulation unit 37 and the transmission unit 34. The set modulation levels of the quality degraded channel and the adjacent channel being the switching targets may be switched to be substantially the same or may be switched to be different. In the case where the set modulation levels are switched to be different, the set modulation level of the quality degraded channel being the switching target may be lowered to a first value and the set modulation level of the adjacent channel being the switching target may be lowered to a second value higher than the first value.

The transmission unit 34 includes a transmission processing unit 40 and a radio transmission unit 41.

The transmission processing unit 40 performs transmission processing such as encoding and modulation on the switching control signal received from the switching control unit 33 and outputs the transmission signal thus obtained to the radio transmission unit 41.

The radio transmission unit 41 performs radio transmission processing such as digital-analog conversion or up-converting on the transmission signal output from the transmission processing unit 40 and transmits the radio signal thus obtained via the antenna.

Figure 5:
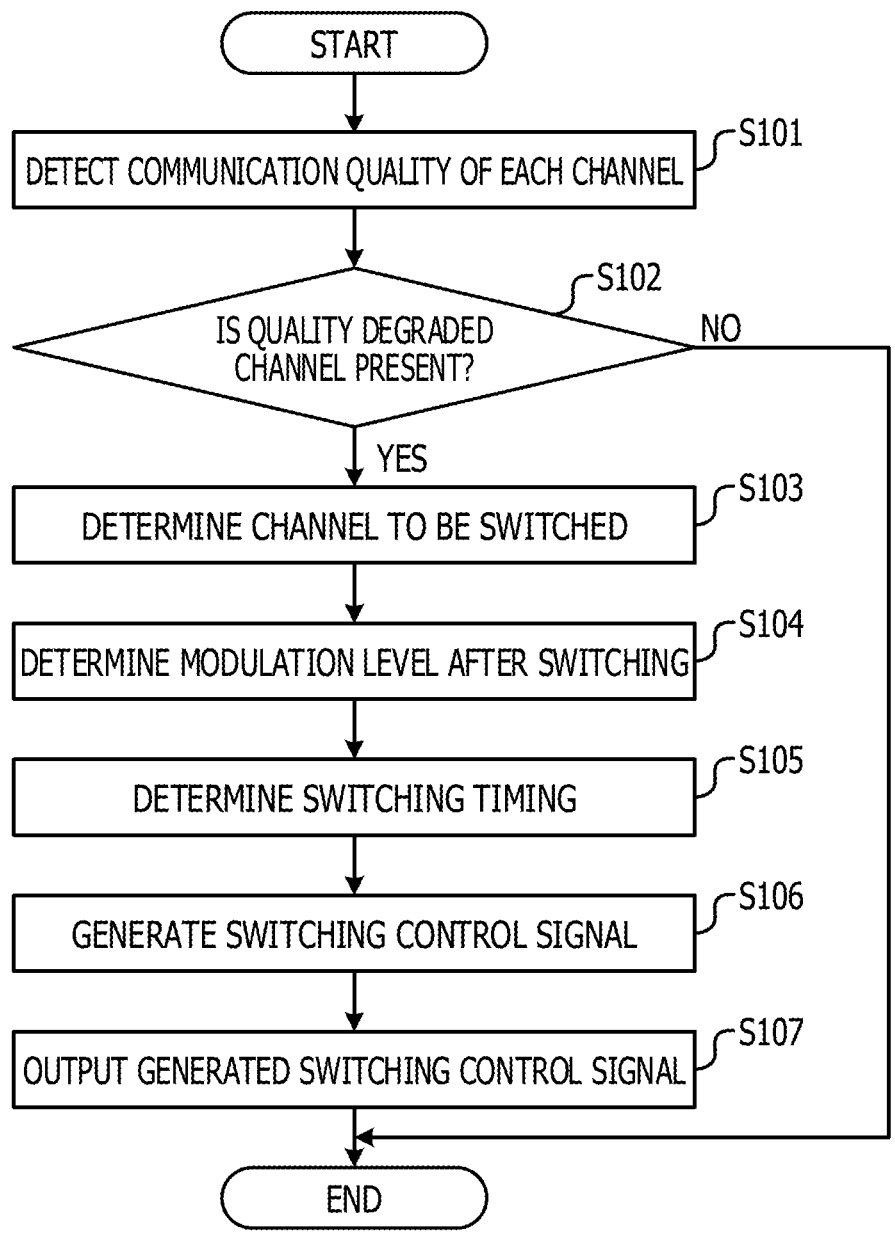
FIG. 5 illustrates exemplary processing performed by a radio communication device on a reception side.

FIG. 5 illustrates exemplary processing performed by a radio communication device on a reception side. The radio communication device on a reception side illustrated in FIG. 3 may perform the processing illustrated in FIG. 5. The processing illustrated in FIG. 5 may be performed for each determination period described above.

The quality detection unit 32 detects the communication quality of each channel based on the signal received from the reception processing unit 36 corresponding to each channel (operation S101).

The quality detection unit 32 determines whether a quality degraded channel is present or not based on the communication quality of each channel thus detected (operation S102). For example, the quality detection unit 32 determines whether a channel is present or not of which the detected communication quality has been lowered to a certain level or lower.

When a quality degraded channel is present (Yes at operation S102), the switching control unit 33 determines a switching target channel (operation S103). For example, the switching control unit 33 determines the quality degraded channel and at least one of the two adjacent channels that are adjacent to the quality degraded channel in the frequency direction to be the switching target channels.

The switching control unit 33 determines a modulation level after switching of the switching target channel (operation S104) and determines a switching timing (operation S105).

The switching control unit 33 generates a switching control signal including information determined by operations S103 to S105 (operation S106).

The switching control unit 33 outputs the switching control signal thus generated to the demodulation unit 37 and the transmission unit 34 (operation S107).

In the radio communication device 30, the quality detection unit 32 detects the communication quality of each channel. The switching control unit 33 performs the "switching control" that lowers the set modulation level of the quality degraded channel of which the communication quality detected by the quality detection unit 32 has been lowered to a certain level or lower and the set modulation level of at least one of the two adjacent channels that are adjacent to the quality degraded channel in the frequency axis direction.

In the radio communication device 30, the quality degraded channel of which the communication quality has been degraded to a certain level or lower and the set modulation levels of the channels adjacent to the quality degraded channel are lowered, and accordingly, even when the frequency position where frequency selective fading occurs moves at a high speed, adaptive modulation may follow the move. Quality degradation of the transmission signals may be reduced even under high speed moving fading environment.

The moving direction of the position of a notch that occurs in the quality degraded channel may be calculated and the modulation level of the adjacent channel present in the calculated moving direction may be lowered.

Figure 6:
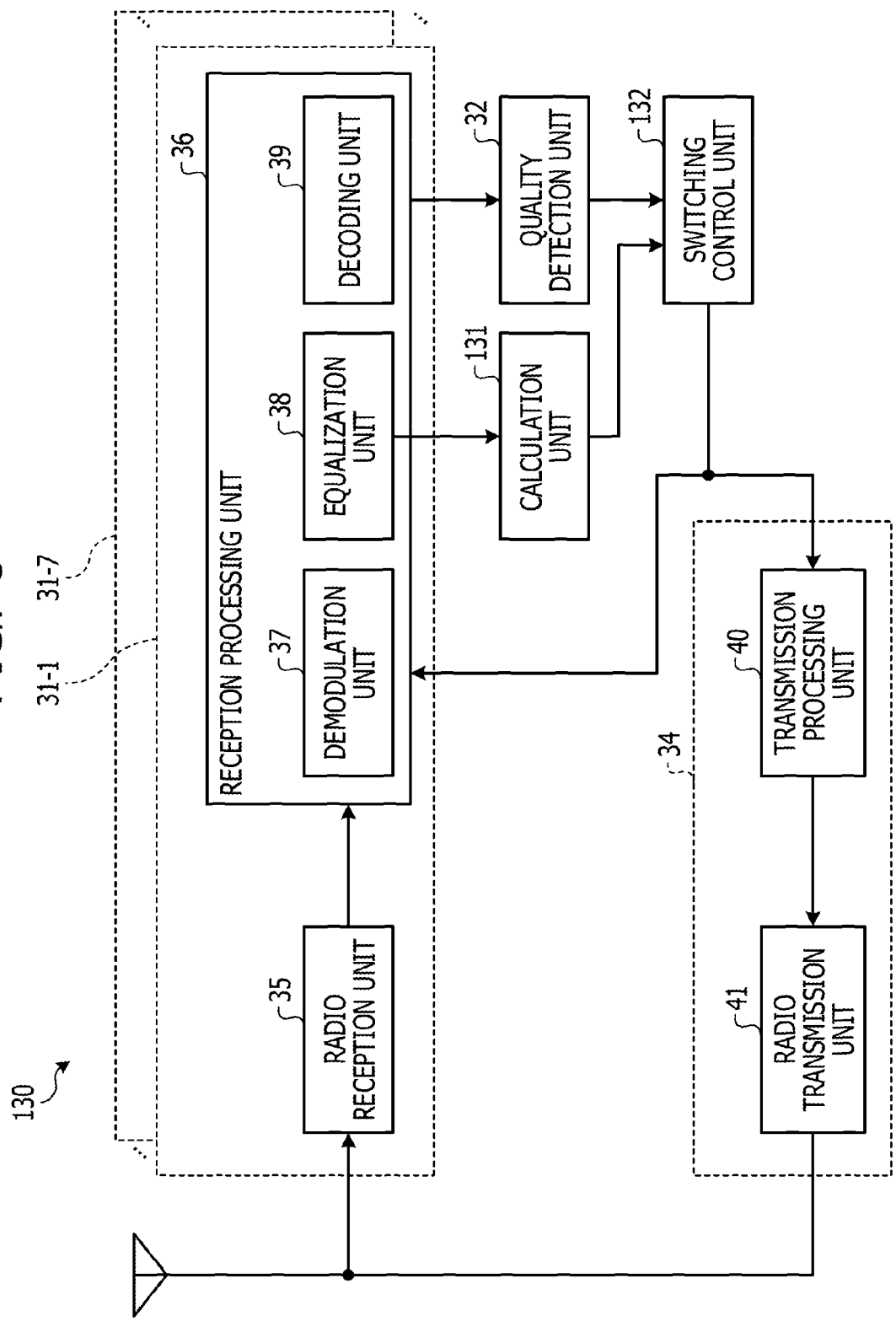
FIG. 6 illustrates an exemplary radio communication device on a reception side.

FIG. 6 illustrates an exemplary radio communication device on a reception side. In FIG. 6, a radio communication device 130 includes a calculation unit 131 and a switching control unit 132.

The calculation unit 131 calculates the moving direction of the frequency position of the notch in each channel. The calculation unit 131 outputs the moving direction calculated for each channel to the switching control unit 132.

For example, the calculation unit 131 acquires a "tap coefficient group" from the equalization unit 38 of the reception unit 31 corresponding to each channel for each calculation timing (calculation period). The calculation unit 131 calculates (identifies) the frequency position of the notch occurrence based on the "tap coefficient group" for each channel. The calculation unit 131 calculates (identifies) the moving direction of the frequency position of the notch based on the frequency position of the notch occurrence calculated at the previous calculation timing and the frequency position of the notch occurrence calculated at this calculation timing for each channel.

Figure 7:
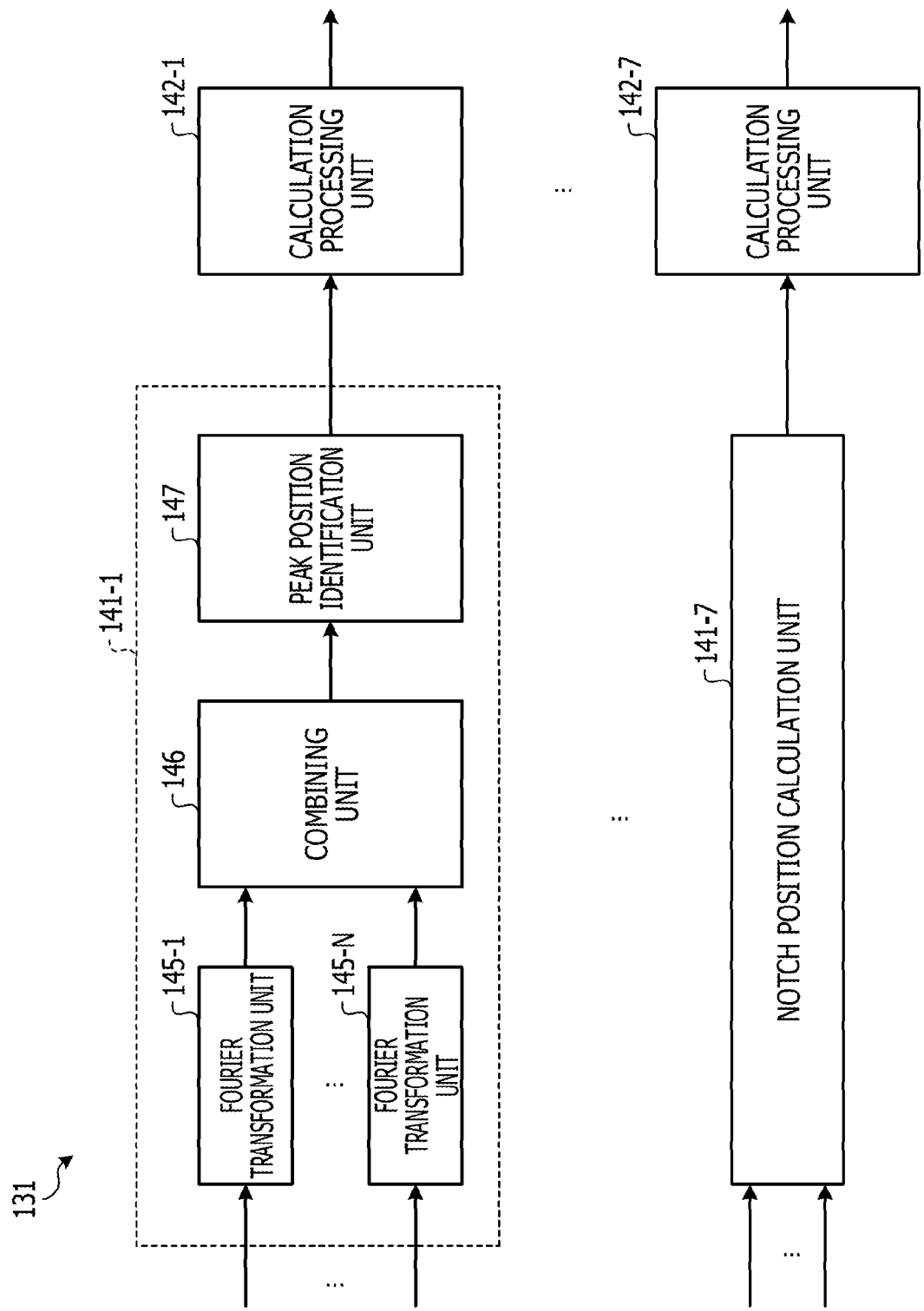
FIG. 7 illustrates an exemplary calculation unit.

FIG. 7 illustrates an exemplary calculation unit. For example, the calculation unit 131 includes notch position calculation units 141-1 to 141-7 and calculation processing units 142-1 to 142-7, as illustrated in FIG. 7. Each notch position calculation unit 141 includes Fourier transformation units 145-1 to 145-N, a combining unit 146, and a peak position identification unit 147.

The notch position calculation units 141-1 to 141-7 may correspond to the channels 1 to 7, respectively. For example, in the notch position calculation unit 141-1, the Fourier transformation units 145-1 to 145-N may correspond to tap coefficients 1 to N of the equalization unit 38 of the reception unit 31-1 of the channel 1, respectively. Each Fourier transformation unit 145 performs Fourier transformation of time fluctuation of a tap coefficient value acquired at the calculation timing and outputs the result thus obtained to the combining unit 146. The combining unit 146 combines (adds) the result obtained by each of the Fourier transformation units 145-1 to 145-N and outputs the result thus obtained to the peak position identification unit 147. The peak position identification unit 147 identifies (calculates) the frequency position where a peak appears in the combined result received from the combining unit 146.

With the tap coefficient group of the equalization unit 38 undergoing Fourier transformation, the filter characteristic of the equalization unit 38 is calculated. When the notch occurs, with the filter characteristic of the equalization unit 38, a peak appears in the frequency position of the notch occurrence so as to compensate for the notch. With the peak frequency position of the filter characteristic identified, the frequency position of the notch occurrence is identified.

The calculation processing units 142-1 to 142-7 may correspond to the channels 1 to 7, respectively. For example, the calculation processing unit 142-1 calculates (identifies) the moving direction of the frequency position of the notch occurrence based on the frequency position of the notch occurrence calculated at the previous calculation timing and the frequency position of the notch occurrence calculated at this calculation timing by the notch position calculation unit 141-1.

Similarly to the switching control unit 33 illustrated in FIG. 3, the switching control unit 132 illustrated in FIG. 6 first determines the quality degraded channel indicated by the identification information received from the quality calculation unit 47 to be a switching target channel. The switching control unit 132 determines the channel adjacent to the quality degraded channel and present in the moving direction calculated by the calculation processing unit 142 that corresponds to the quality degraded channel to be another switching target channel. The switching control unit 132 generates a "switching control signal" including identification information of the switching target channel, information indicating the modulation level after being lowered, and information indicating the switching timing. The switching control unit 132 outputs the switching control signal thus generated to the demodulation unit 37 and the transmission unit 34. The set modulation levels of the quality degraded channel and the adjacent channel being the switching targets may be switched to be the same or may be switched to be different. In the case where the set modulation levels are switched to be different, the set modulation level of the quality degraded channel being the switching target may be lowered to a first value and the set modulation level of the adjacent channel being the switching target may be lowered to a second value higher than the first value.

Figure 8:
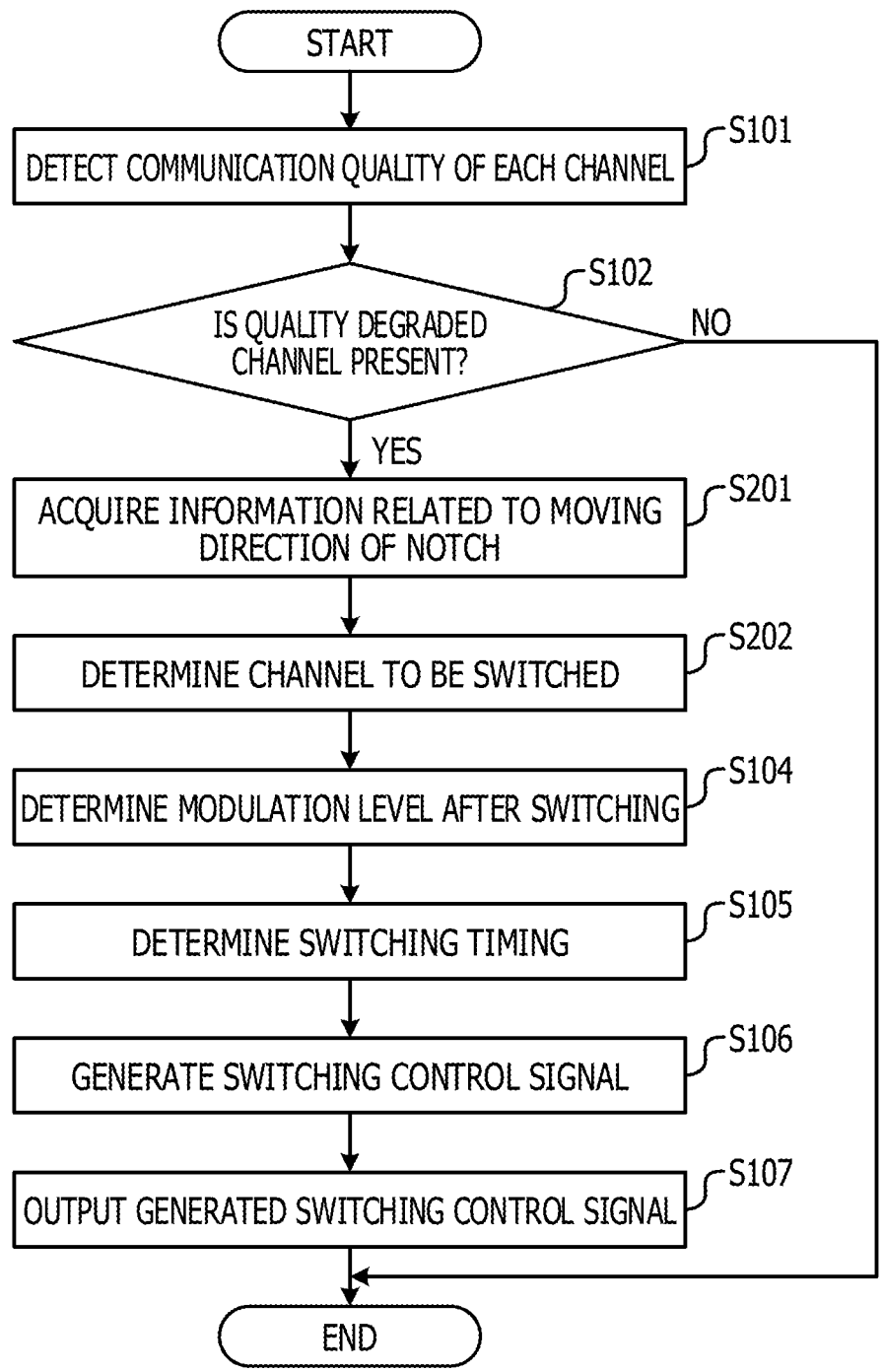
FIG. 8 illustrates exemplary processing performed by a radio communication device on a reception side.

FIG. 8 illustrates exemplary processing performed by a radio communication device on a reception side. The radio communication device on a reception side illustrated in FIG. 6 may perform the processing illustrated in FIG. 8. The processing illustrated in FIG. 8 may be performed for each determination period.

When a quality degraded channel is present (Yes at operation S102), the switching control unit 132 acquires information related to the moving direction calculated by the calculation processing unit 142 corresponding to the quality degraded channel (operation S201).

The switching control unit 132 determines the switching target channel (operation S202). For example, the switching control unit 132 determines the quality degraded channel to be the switching target channel. The switching control unit 132 determines the channel adjacent to the quality degraded channel and present in the moving direction indicated by the information acquired by operation S201 to be the switching target channel.

The switching control unit 132 performs the "switching control" that lowers the modulation level of the quality degraded channel and the modulation level of the channel adjacent to the quality degraded channel that is present in the moving direction of the frequency position of the notch occurred in the quality degraded channel, which has been calculated by the calculation unit 131.

In the radio communication device 130, not only the set modulation level of the quality degraded channel of which the communication quality has been degraded to a certain level or lower but also the set modulation level of the channel adjacent to the quality degraded channel that is present in the moving direction of the frequency position where frequency selective fading occurs may be lowered. Accordingly, even when the frequency position where frequency selective fading occurs moves at a high speed, adaptive modulation may follow the move with high accuracy. Quality degradation of the transmission signals may be reduced even under high speed moving fading environment.

For example, the moving direction of the position of the notch occurrence in the quality degraded channel may be calculated and the modulation level of an adjacent channel present in the calculated moving direction may be lowered. The moving speed of the frequency position of the notch occurrence in the quality degraded channel is calculated, and when the calculated moving speed is equal to or higher than the threshold, the set modulation levels of an adjacent channel present in the calculated moving direction and a channel adjacent to the adjacent channel are lowered. For example, the number of the switching target channels may be changed in accordance with the moving speed of the notch frequency position.

Figure 9:
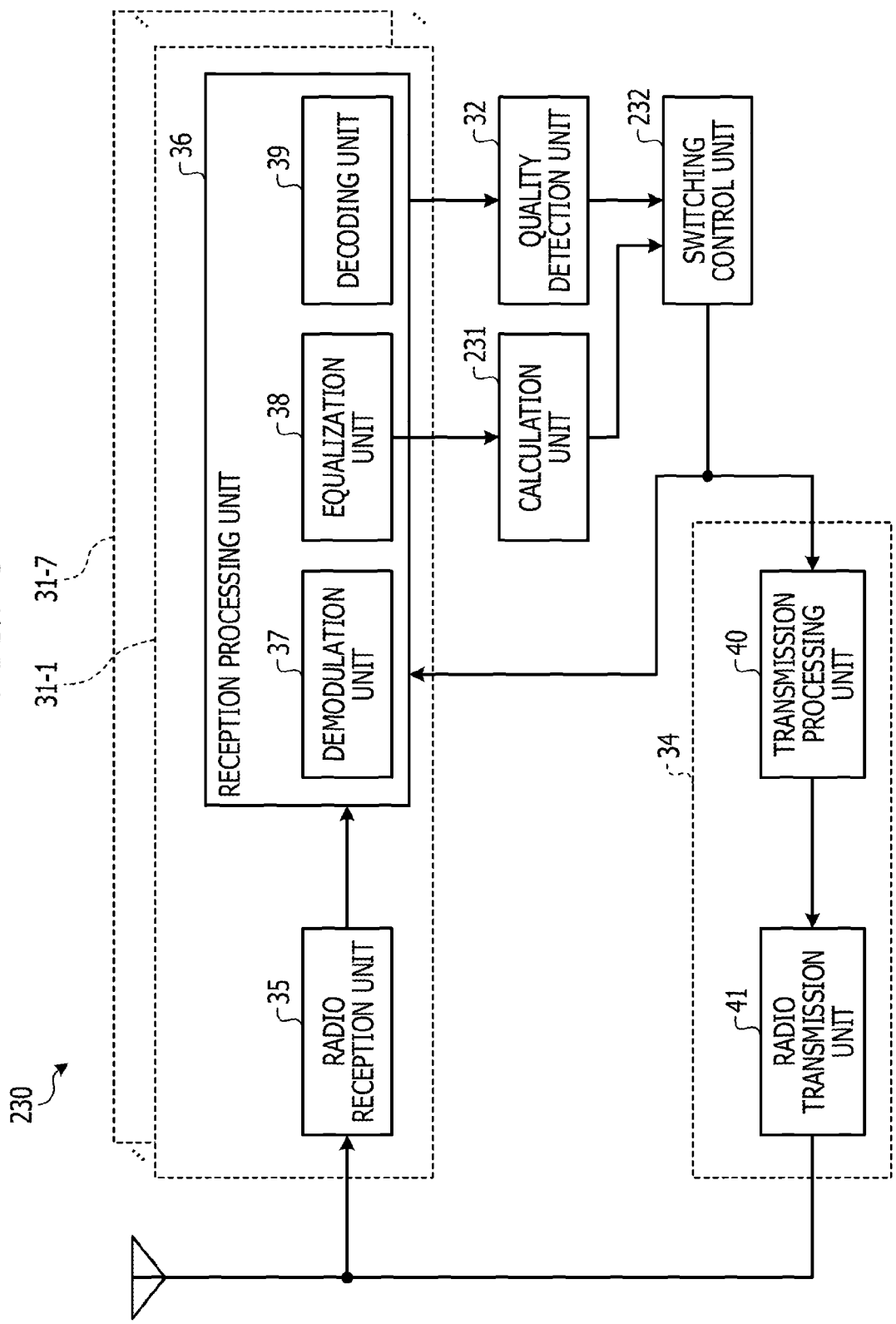
FIG. 9 illustrates an exemplary radio communication device on a reception side.

FIG. 9 illustrates an exemplary radio communication device on a reception side. In FIG. 9, the radio communication device 230 includes a calculation unit 231 and a switching control unit 232.

The calculation unit 231 calculates the moving direction and the moving speed of the frequency position of the notch in each channel. The calculation unit 231 outputs the moving direction and the moving speed calculated for each channel to the switching control unit 232.

For example, the calculation unit 231 acquires a "tap coefficient group" from the equalization unit 38 of the reception unit 31 corresponding to each channel for each calculation timing (calculation period). The calculation unit 231 calculates (identifies) the frequency position of the notch occurrence based on the "tap coefficient group" for each channel. The calculation unit 231 calculates (identifies) the moving direction and the moving speed of the frequency position of the notch using the frequency position of the notch occurrence calculated at the previous calculation timing and the frequency position of the notch occurrence calculated at this calculation timing for each channel.

Figure 10:
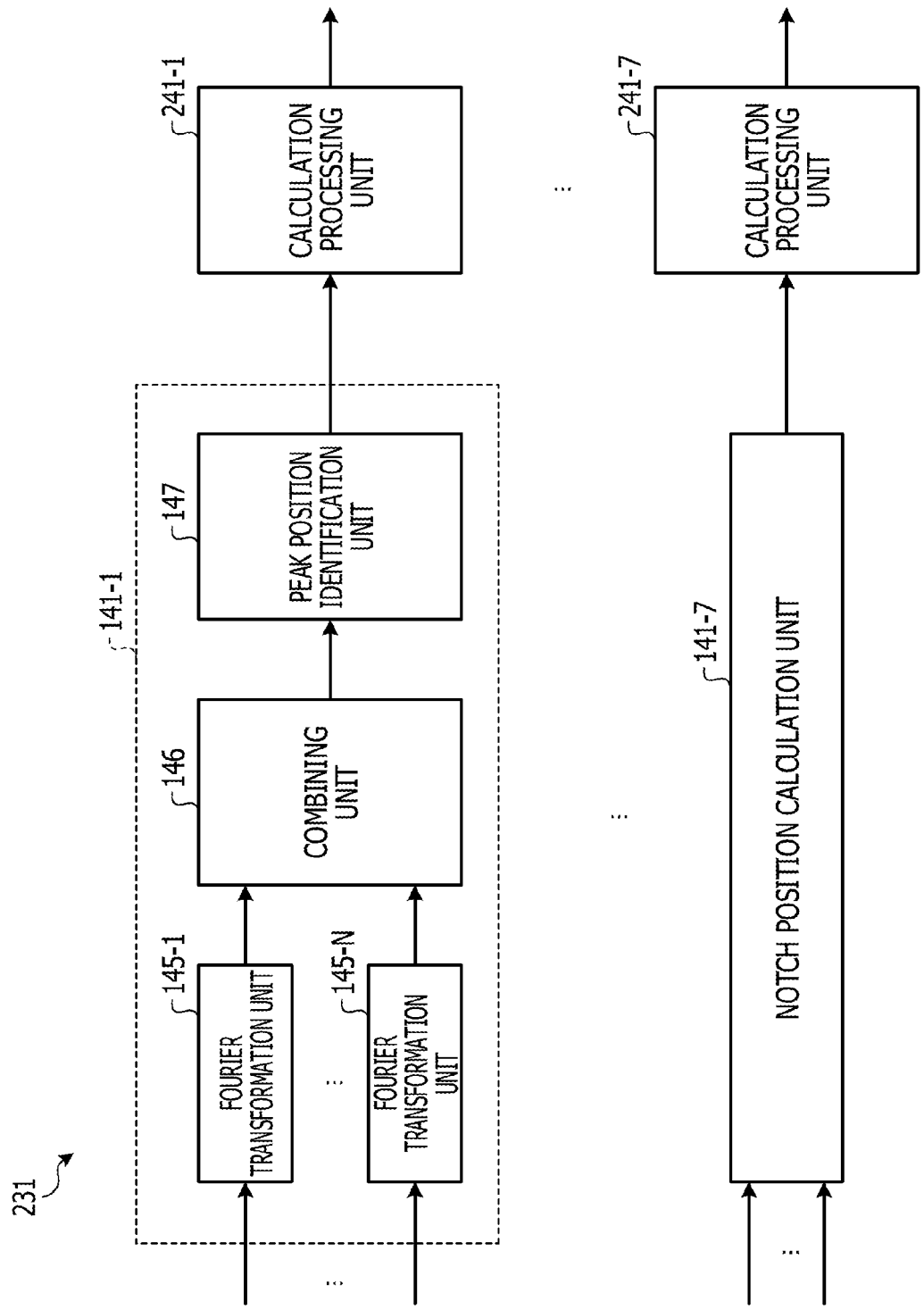
FIG. 10 illustrates an exemplary calculation unit.

FIG. 10 illustrates an exemplary calculation unit. As illustrated in FIG. 10, the calculation unit 231 includes calculation processing units 241-1 to 241-7.

The calculation processing units 241-1 to 241-7 may correspond to the channels 1 to 7. For example, the calculation processing unit 241-1 calculates (identifies) the moving direction of the frequency position of the notch based on the frequency position of the notch occurrence calculated by the notch position calculation unit 141-1 at the previous calculation timing and the frequency position of the notch occurrence calculated at this calculation timing. The calculation processing unit 241-1 calculates the difference between the frequency position of the notch occurrence calculated by the notch position calculation unit 141-1 at the previous calculation timing and the frequency position of the notch occurrence calculated at this calculation timing, such as the moving distance. The calculation processing unit 241-1 divides the calculated moving distance by the time difference between the previous calculation timing and this calculation timing, thereby calculating the moving speed.

The switching control unit 232 illustrated in FIG. 9 may perform the "switching control" similar to that performed by the switching control unit 132 illustrated in FIG. 6 when the moving speed is lower than the threshold. For example, the switching control unit 232 performs "switching control" that lowers the modulation level of the quality degraded channel and the modulation level of the channel adjacent to the quality degraded channel present in the moving direction of the frequency position where the notch occurs in the quality degraded channel, which has been calculated by the calculation unit 231.

When the moving speed is equal to or higher than the threshold, the switching control unit 232 lowers the set modulation level of a channel adjacent to the adjacent channel. The set modulation levels of the adjacent channel and the channel adjacent to the adjacent channel being the switching targets may be switched to be the same and may be switched to be different. In the case where the set modulation levels are switched to be different, the set modulation level of the adjacent channel being the switching target may be lowered to a second value and the set modulation level of the channel adjacent to the adjacent channel being the switching target may be lowered to a third value higher than the second value. For example, the set modulation level of a channel closer to the quality degraded channel in the frequency axis direction may be made lower.

Figure 11:
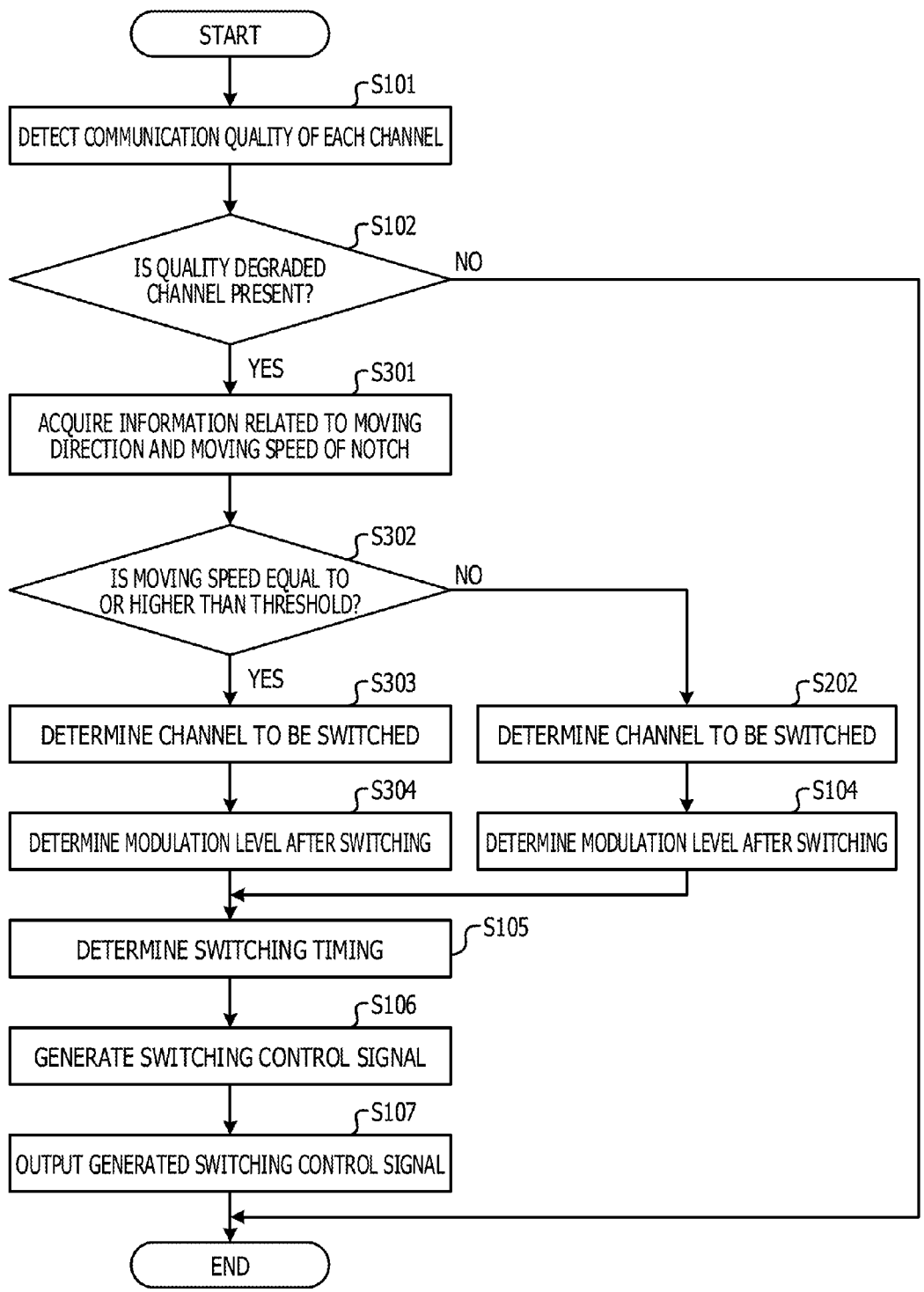
FIG. 11 illustrates exemplary processing performed by a radio communication device.

FIG. 11 illustrates exemplary processing performed by a radio communication device on a reception side. The radio communication device on a reception side illustrated in FIG. 9 may perform the processing illustrated in FIG. 11. Processing in the flow chart illustrated in FIG. 11 may be performed for each determination period.

When a quality degraded channel is present (Yes at operation S102), the switching control unit 232 acquires information related to the moving direction and the moving speed calculated by the calculation processing unit 241 corresponding to the quality degraded channel (operation S301).

The switching control unit 232 determines whether the moving speed indicated by the information thus acquired is equal to or higher than the threshold (operation S302).

When the moving speed is equal to or higher than the threshold (Yes at operation S302), the switching control unit 232 determines the switching target channel (operation S303). For example, the switching control unit 232 determines the quality degraded channel, the adjacent channel present in the moving direction of the frequency position of the notch occurrence in the quality degraded channel, which has been calculated by the calculation unit 231, and the channel adjacent to the adjacent channel to be the switching target channels.

The switching control unit 232 determines the modulation level after switching of the switching target channels (operation S304). For example, the switching control unit 232 may lower the set modulation level of the quality degraded channel to a first value, lower the set modulation level of the adjacent channel to a second value higher than the first value, and lower the set modulation level of the channel adjacent to the adjacent channel to a third value higher than the second value. When the moving speed is lower than the threshold (No at operation S302), the switching control unit 232 performs operation S202 and operation S104.

In the radio communication device 230, when the moving speed of the frequency position of the notch occurrence in the quality degraded channel is equal to or higher than the threshold, the switching control unit 232 determines the quality degraded channel, the adjacent channel present in the moving direction of the frequency position of the notch occurrence in the quality degraded channel, which has been calculated by the calculation unit 231, and the channel adjacent to the adjacent channel to be the switching target channels.

In the radio communication device 230, when the moving speed of the notch frequency position is high, not only the set modulation levels of the quality degraded channel and the adjacent channel but also the set modulation level of the channel adjacent to the adjacent channel may be lowered. Accordingly, even when the frequency position where frequency selective fading occurs moves at a high speed, adaptive modulation may follow the move with high accuracy. Quality degradation of the transmission signals may be reduced even under high speed moving fading environment.

The switching control unit 232 lowers the set modulation level of the adjacent channel to the second value and lowers the set modulation level of the channel adjacent to the adjacent channel to the third value higher than the second value.

In the radio communication device 230, the farther from the quality degraded channel, the smaller the amount of the lowered set modulation level is set. Accordingly, excessive lowering of the set modulation level of a channel having time until frequency selective fading occurs may be reduced.

The communication quality of the channels may be detected based on the PN pattern signal. For example, the communication quality of the channels may be detected based on the distribution on the constellation of the reception signal points when the signal transmitted from the radio communication device on a transmission side is received by the radio communication device on a reception side, for example.

All or any part of various elements in each of the units described above may be distributed/integrated functionally or physically in any units in accordance with various loads, use conditions, and other factors.

All parts or any part of various processing functions performed in each device may be performed on a central processing unit (CPU) or a microcomputer such as a micro processing unit (MPU) and a micro controller unit (MCU). All parts or any part of various processing functions may be performed on a program analyzed and executed by a CPU or a microcomputer such as an MPU, and a MCU, or on hardware by wired logic.

The radio communication devices described above may include a hardware configuration as described below, for example.

Figure 12:
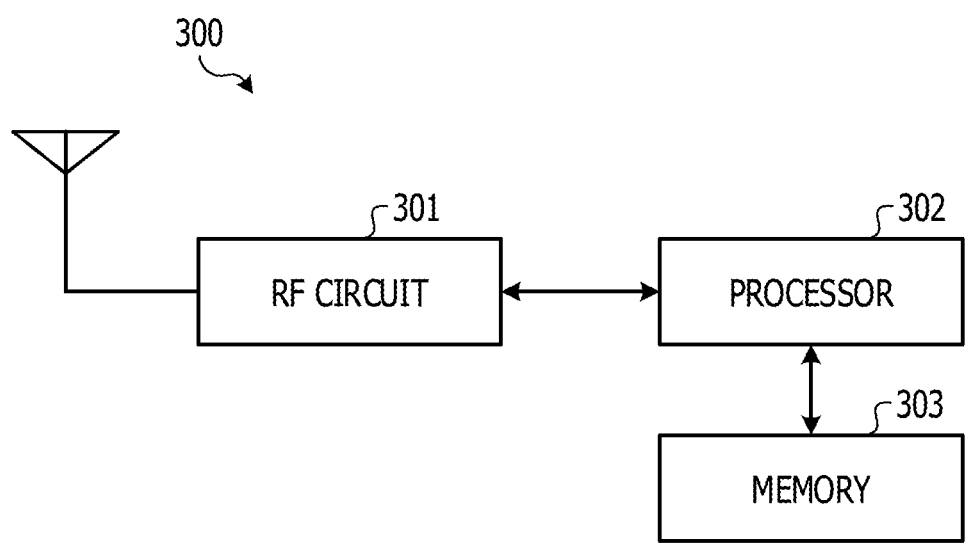
FIG. 12 illustrates an exemplary hardware configuration of a radio communication device.

FIG. 12 illustrates an exemplary hardware configuration of a radio communication device. As illustrated in FIG. 12, the radio communication device 300 includes a radio frequency (RF) circuit 301, a processor 302, and a memory 303. The processor 302 may be a CPU, a digital signal processor (DSP), or a field programmable gate array (FPGA), and so on. The memory 303 may be a random access memory (RAM) such as a synchronous dynamic random access memory (SDRAM), a read only memory (ROM), or a flash memory. Each of the radio communication devices 10, 30, 130, and 230 may include the configuration illustrated in FIG. 12.

Various processing functions performed in the radio communication devices described above may be implemented by executing, by a processor, programs stored in various memories such as non-volatile storage media. For example, the memory 303 may store therein programs corresponding to processing performed by the PN pattern signal output unit 12, the transmission processing unit 15, the reception processing unit 20, and the extraction unit 21, and the processor 302 may perform each of the programs. The memory 303 may store therein programs corresponding to processing performed by the quality detection unit 32, the switching control units 33, 132, 232, the reception processing unit 36, the transmission processing unit 40, and the calculation units 131 and 231, and the processor 302 may perform each of the programs. The radio transmission unit 18 and the radio reception unit 19 may be implemented by the RF circuit 301. The radio reception unit 35 and the radio transmission unit 41 may be implemented by the RF circuit 301.

Various processing functions performed by the radio communication devices may be performed by the processor 302, and may be performed by a plurality of processors.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication device comprising:
   a processor configured to execute a program; and
   a memory configured to store the program,
   wherein the processor performs, based on the program, operations to:
   detect communication quality of each of a plurality of channels; and
   lower a first set modulation level of a first channel with the communication quality which is equal to or lower than a level and a second set modulation level of a first adjacent channel which corresponds to one of two adjacent channels adjacent to the first channel in a frequency axis direction.

2. The radio communication device according to claim 1, wherein the processor detects the communication quality based on a PN pattern signal included in reception data.

3. The radio communication device according to claim 1, wherein the processor calculates a moving direction of a frequency position of a notch occurred in the first channel and lowers the second set modulation level of an adjacent channel present in the moving direction as the first adjacent channel.

4. The radio communication device according to claim 3, wherein the processor acquires the moving direction based on a first frequency position of the notch calculated at a first calculation timing and a second frequency position of the notch calculated at a second calculation timing.

5. The radio communication device according to claim 1, wherein the processor calculates a moving direction and a moving speed of a frequency position of a notch occurred in the first channel, lowers the second set modulation level of an adjacent channel present in the moving direction as the first adjacent channel, and determines whether or not to lower a third set modulation level of a second adjacent channel adjacent to the first adjacent channel based on the moving speed.

6. The radio communication device according to claim 5, wherein the processor lowers the third set modulation level of the second adjacent channel when the calculated moving speed is equal to or higher than a threshold.

7. The radio communication device according to claim 1, wherein the processor lowers the first set modulation level of the first channel to a first value and lowers the second set modulation level of the first adjacent channel to a second value higher than the first value.

8. A radio communication method comprising:
   detecting communication quality of each of a plurality of channels; and
   lowering, by a processor, a first set modulation level of a first channel with the communication quality which is equal to or lower than a level and a second set modulation level of a first adjacent channel which corresponds to one of two adjacent channels adjacent to the first channel in a frequency axis direction.

9. The radio communication method according to claim 8, wherein the detecting is performed based on a PN pattern signal included in reception data.

10. The radio communication method according to claim 8, further comprising:
    calculating a moving direction of a frequency position of a notch occurred in the first channel; and
    lowering the second set modulation level of an adjacent channel present in the moving direction as the first adjacent channel.

11. The radio communication method according to claim 10, further comprising:
    acquiring the moving direction based on a first frequency position of the notch calculated at a first calculation timing and a second frequency position of the notch calculated at a second calculation timing.

12. The radio communication method according to claim 8, further comprising:
    calculating a moving direction and a moving speed of a frequency position of a notch occurred in the first channel; and
    lowering the second set modulation level of an adjacent channel present in the moving direction as the first adjacent channel; and
    determining whether or not to lower a third set modulation level of a second adjacent channel adjacent to the first adjacent channel based on the moving speed.

13. The radio communication method according to claim 12, wherein the third set modulation level is preformed when the calculated moving speed is equal to or higher than a threshold.

14. The radio communication method according to claim 8, the first set modulation level is lowered to a first value and the second set modulation level is lowered to a second value higher than the first value.

15. A radio communication system comprising:
    a second radio communication device on a reception side communicable with a first radio communication device on a transmission side via a plurality of channels,
    wherein the second radio communication device:
    detects communication quality of each of the plurality of channels; and
    lowers a first set modulation level of a first channel with the communication quality which is equal to or lower than a level and a second set modulation level of a first adjacent channel which corresponds to one of two adjacent channels adjacent to the first channel in the frequency axis direction.

16. The radio communication system according to claim 15, wherein the second radio communication device detects the communication quality based on a PN pattern signal included in reception data.

17. The radio communication system according to claim 15, wherein the second radio communication device calculates a moving direction of a frequency position of a notch occurred in the first channel and lowers the second set modulation level of an adjacent channel present in the moving direction as the first adjacent channel.

18. The radio communication system according to claim 17, wherein the second radio communication device acquires the moving direction based on a first frequency position of the notch calculated at a first calculation timing and a second frequency position of the notch calculated at a second calculation timing.

19. The radio communication system according to claim 15, wherein the second radio communication device calculates a moving direction and a moving speed of a frequency position of a notch occurred in the first channel, lowers the second set modulation level of an adjacent channel present in the moving direction as the first adjacent channel, and determines whether or not to lower a third set modulation level of a second adjacent channel adjacent to the first adjacent channel based on the moving speed.

20. The radio communication system according to claim 15, wherein the second radio communication device lowers the first set modulation level of the first channel to a first value and lowers the second set modulation level of the first adjacent channel to a second value higher than the first value.

* * * * *